United States Patent [19]
Hulett

[11] Patent Number: 5,853,062
[45] Date of Patent: *Dec. 29, 1998

[54] RECUMBENT ELECTRICALLY POWER-ASSISTED BICYCLE

[75] Inventor: Roger Hulett, San Juan Capistrano, Calif.

[73] Assignee: Yamaha Hatsudoki Kabushiki Kaisha, Iwata, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 557,956

[22] Filed: Nov. 13, 1995

[51] Int. Cl.⁶ .................................................. B62K 11/06
[52] U.S. Cl. ..................... 180/206; 180/207; 180/220; 280/214; 280/288.1
[58] Field of Search ................................ 180/205, 206, 180/207, 220; 280/212, 214, 288.1, 288.4

[56] References Cited

U.S. PATENT DOCUMENTS

| | | | |
|---|---|---|---|
| 4,410,198 | 10/1983 | Fernandes et al. | 280/288.2 X |
| 4,480,848 | 11/1984 | Georgiev | 280/288.1 |
| 4,541,500 | 9/1985 | Gelhard | 180/205 |
| 5,261,686 | 11/1993 | Buckler | 280/288.1 X |
| 5,342,074 | 8/1994 | Amdahl et al. | 280/282 X |
| 5,474,148 | 12/1995 | Takata | 180/206 |
| 5,509,678 | 4/1996 | Ullman et al. | 280/288.1 |

OTHER PUBLICATIONS

Stephen Delaire, "Electric HPV", Human Powered Vehicle, (May/Jun. 1992), p. 3.

*Primary Examiner*—Peter C. English
*Assistant Examiner*—Avraham Lerner
*Attorney, Agent, or Firm*—Knobbe, Martens, Olson & Bear LLP

[57] ABSTRACT

A recumbent electrically power-assisted bicycle which permits a shortened wheelbase by positioning the rider in an adjustable seat above the rear wheel. The battery, motor, and controller comprising the power assist system are mounted at the front of the bicycle's frame so as to provide stability, and also provide power assist to the bicycle under startup and high pedalling load conditions.

11 Claims, 2 Drawing Sheets

RECUMBENT ELECTRICALLY POWER-ASSISTED BICYCLE

BACKGROUND OF THE INVENTION

This invention relates to an electrically power-assisted bicycle and more particularly to an improved, recumbent electrically power-assisted bicycle.

There has been a demand for a type of bicycle referred to as a recumbent bicycle. This type of bicycle is oriented so that the rider is seated in a reclined or semi-reclined fashion. The pedal mechanism which drives the rear wheel is disposed substantially forwardly and below the seat in the frame so that the rider rides in the semi-reclined position. This particular type of bicycle is favored by older or disabled individuals. However, the use is not so limited. Although this type of bicycle has a number of advantages, the conventional types previously employed have certain disadvantages.

One of the prime disadvantages of this type of bicycle is that, because of the riding position, the rider is not able to exert large forces on the pedals as with a more conventional type of bicycle, during start up or periods when pedaling effort may be high. The reason for this is that the rider may not stand on the pedals as with a conventional bicycle, because of the unique riding orientation. Because of the seating position stability at start up is somewhat reduced.

It is, therefore, a principal object of this invention to provide an improved recumbent bicycle embodying an electric power assist for facilitating startup and pedaling when under high load conditions.

It is a further object of this invention to provide an electrically powered-assisted recumbent bicycle wherein the power assist can be more closely related to the needs of the rider.

Another disadvantage with the type of recumbent bicycles previously employed is that they have a fairly substantial long wheel base. The reason for this is that the position of the rider demands such a long wheel base. This is particularly true if the rider is not to be seated over the rear wheel but is seated forwardly of it, as is conventional with these types of bicycles. The wheel base of the bicycle can be substantially reduced if the rider is positioned at least in part over the rear wheel.

However, the positioning of the rider over the rear wheel dictates the use of smaller rear wheels. Use of a small rear wheel means that there must be a larger power reduction in the mechanism that drives the rear wheel in order to reduce pedaling effort. This use of large reduction ratios can compromise the transmission system.

It is, therefore, a still further object of this invention to provide an improved recumbent electrically power-assisted bicycle wherein the wheel base may be shortened by utilizing a smaller than normal rear wheel and positioning the rider over the rear wheel and providing an appropriate power assist so that such small rear wheels can be employed.

Still another disadvantage with recumbent-type bicycles is that the weight bias is rather heavily toward the rear wheel. At times, this can make the steering operation of the bicycle unsatisfactory.

It is, therefore, a still further object of this invention to provide an improved recumbent bicycle wherein the balance of the weight on the front and rear wheels is more uniform.

SUMMARY OF THE INVENTION

The features of this invention are adapted to be embodied in a recumbent bicycle having a frame assembly that dirigibly supports a front wheel at the front thereof and rotatably supports a rear wheel at the rear end of thereof. A pedal assembly for receiving a manual input force and for driving the rear wheel is disposed at the front of the frame assembly. A seat for the rider is disposed at the rear of the frame assembly and in such an orientation that the rider, when pedaling is in a recumbent posture.

In accordance with a first feature of the invention, an electric power assist is provided for the bicycle wherein the electric power, controls and at least a portion of the transmission mechanism associated therewith for driving the rear wheel is positioned closely adjacent the front wheel so as to improve the front to rear weight bias.

In accordance with another feature of the invention, the electric motor control includes a torque sensor for sensing the manual force applied to the pedals and provides a proportionally greater power assist when the pedal input forces are high and speed is low so as to assist in starting and pedaling under high load conditions.

DETAILED DESCRIPTION OF THE PREFERRED EMBODIMENT

Figure 1:
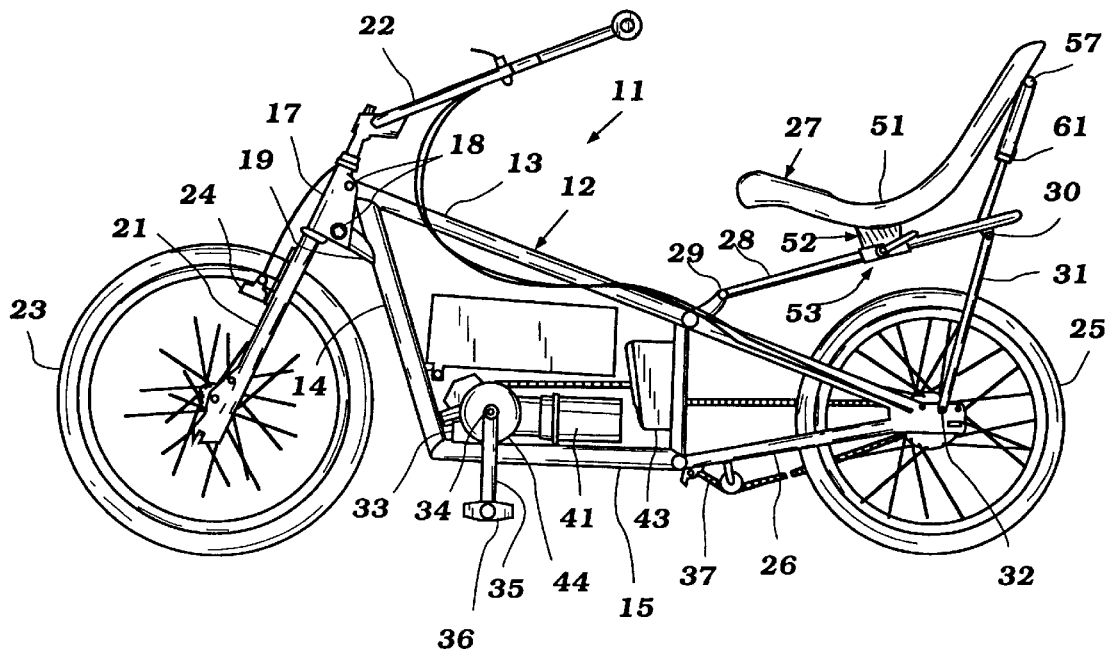
FIG. 1 is a side elevational view of a recumbent bicycle constructed in accordance with an embodiment of the invention.

Referring first in detail to FIG. 1, a bicycle constructed in accordance with an embodiment of the invention is identified generally by the reference numeral 11. The bicycle 11 includes a frame assembly, indicated generally by the reference numeral 12 consisting of a main tube 13 to which is rigidly affixed a down tube 14 by means of welds. The down tube 14 depends downward and rearward and is welded at its lower end to lower tube 15 which, in turn, extends rearward and is welded to the lower end of the rear tube 16. The rear tube 16 extends vertically and connects to the rearmost portion of the main tube 13 by means of welds thus forming a fully enclosed element. A head pipe 17 rigidly connects by means which include the bolts 18 to the forward end of the main tube 13 and to the front of bar 19 which is welded to down tube 14. The head tube 17 journals a front fork 21 for dirigible motion under the control of a handlebar 22. The handlebar 22 is adjustable in any known manner for height and angle to accommodate riders of different stature. This adjustability also accommodates personal preferences of the rider in riding position.

A front wheel 23 is rotatably journaled by the front fork 21 in a known manner. Mounted to the front wheel 23 is velocity sensor 24 which is used in the application and regulation of the power assisted operation of the bicycle to be described later. Although this location for the speed sensor may be preferred, other positions are possible, as will be described.

A rear wheel 25 is journaled at the rear of the frame assembly 12 by means including a pair of rear stays 26 which extend on opposite sides of the rear wheel 25. The rear wheel 25 is driven in a manner which will be described later.

A recumbent seat assembly 27 is slidably supported along seat rails 28 so as to accommodate a rider. The seat rails 28 extend in an upwardly inclined direction over the rear wheel 25. At their forward ends the seat rails 28 are bolted to the frame 12 by means which include the bolt and nut assembly 29. At their rearward ends the seat rails 28 are rigidly affixed by means which include the bolts 30 to stay linkages 31 which, in turn, depend downwards and bolt to the rearmost portion of the rear stays 26 by means which include the bolts 32. The operation of the attachment between the recumbent seat 27 and the seat rail 28 will be described in more detail later.

A bracket 33 is provided at the lower front portion of the frame assembly 12 upon which a crankshaft 34 is rotatably journaled in a known manner. A pair of crank arms 35 are affixed to opposite ends of the crankshaft 34 and carry pedals 36 so as to permit the pedaling of the bicycle 11 by an operator seated upon the recumbent seat 27.

The crankshaft 34 is coupled through a one-way clutch (not shown) to a driving sprocket (not shown) which drives the rear wheel 25 through a suitable chain driving arrangement 37. The aforenoted speed sensor 24 may be associated with the crank mechanism, if desired.

Also mounted to bracket 33 is electric motor 41 which is powered by a rechargeable electrical battery 42 carried in the frame assembly 12 and which powers the motor 41 through a controller 43. Like the crankshaft 34, the output shaft of the electrical motor 41 is connected to the driving sprocket (not shown) through a one-way clutch (not shown) that drives the driving sprocket through a suitable step-down transmission such as a planetary gear transmission (not shown) which is also coupled into the connection of the one-way clutch that connects the crankshaft 34 to the driving sprocket. This coupling of the crankshaft 34 and output shaft of the electric motor 41 to the driving sprocket is described in more detail in the disclosure of which is incorporated herein by reference to United States Letters Patent application entitled "Bicycle With Electric Motor", Ser. No. 08/128866 filed in the name of Nozomu Takata and assigned to the assignee hereof now issued as U.S. Pat. No. 5,474,148 on Dec. 12, 1995.

In the planetary gear reduction set there is provided a torque sensing switch 44 which outputs a signal back to the controller 43 so as to energize the electrical motor 41 in order to provide power assist during times when the driving load is high, either due to the fact that the operator is exerting greater pressure on the pedals 36 or needs to exert a greater force due to pedaling uphill or upon starting.

Referring now to the power assist in more detail the torque exerted at the pedals 36 by the rider is measured at the crank 34 by the torque sensor 44 which signals the controller 43. Based on the measured torque the controller 43 controls the output of the electric motor 41 for power assist.

In general, the power assist is constant in relation to the pedalling force, that is, Fm/Fl=N where Fm is the motor output force, Fl is the rider pedalling force, and N is the assist ratio. It is readily apparent therefore that power assist from the electric motor 41 is supplied increasingly proportionally with increasing rider pedalling torque.

The above relationship does not always meet the operational requirements for the bicycle. An arrangement is therefore provided for varying the amount of electric motor assist in response to the speed at which the bicycle is travelling.

It is desirable to have an even larger assist ratio under startup conditions where, due to the reclined nature of the seating on recumbent bicycles, the rider is unable to supply as high a torque input as would be possible with a bicycle of conventional seating arrangement. To expedite this functionality the velocity sensor 24 signals the controller 43 in those situations where the velocity of the bicycle 11 is below a certain stored value. If the torque sensor 44 simultaneously indicates high pedalling forces then the controller 43 will increase the output of the electric motor 41 such that the assist ratio is substantially greater than when the bicycle 11 is operated under non-startup conditions. Thus, in the control of the power assist in this embodiment, the assist ratio N is held constant at a large value until the speed of the bicycle 11 exceeds the stored value in the controller 43 at which time the power assist ratio N decreases to the lesser constant value of the earlier embodiment.

One of the disadvantages of recumbent bicycles is that the reclined position of the rider necessitates a long wheel base especially when the rider is seated forward of the rear wheel, as is the convention with these types of bicycles. An embodiment of this invention reduces the wheel base by utilizing a smaller rear wheel which then allows the rider to be positioned at least in part over the rear wheel 25.

Figure 2:
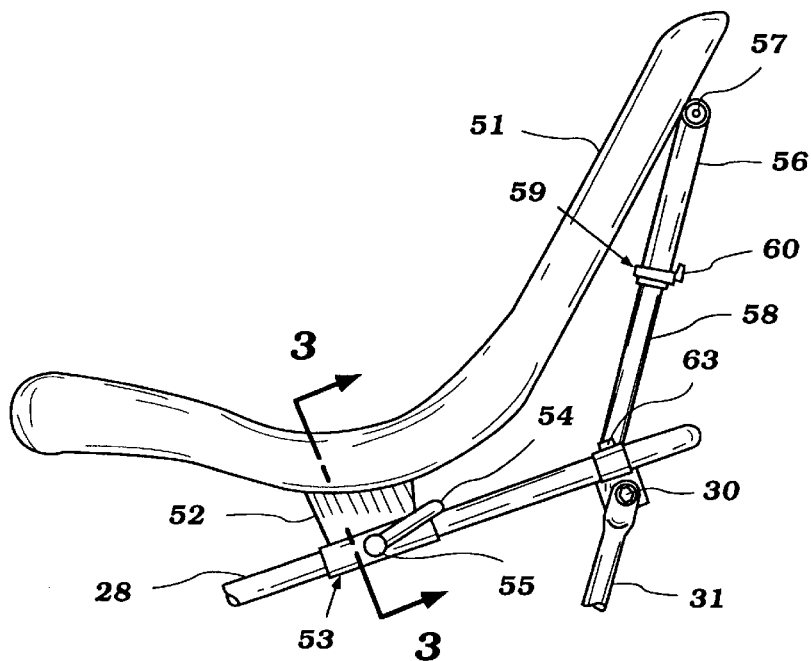
FIG. 2 is an enlarged side elevational view of the seat assembly and its attachment to the bicycle.
Figure 3:
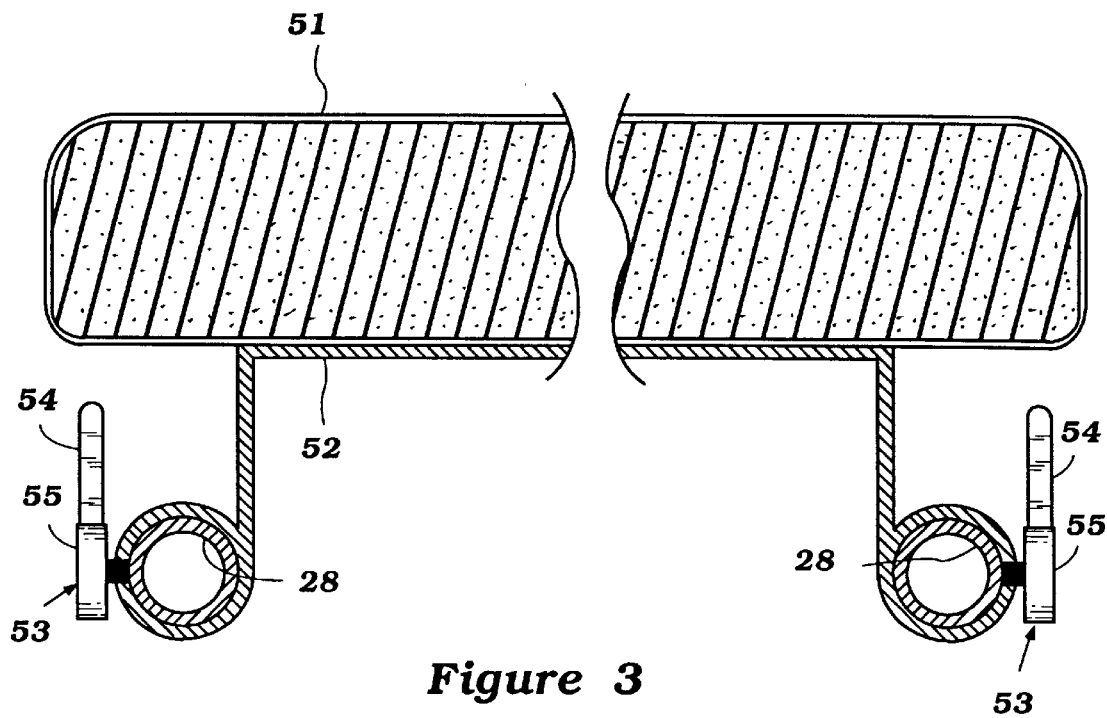
FIG. 3 is an enlarged cross sectional view taken along line 3—3 of FIG. 2, and shows the seat adjustment mechanism.
Figure 4:
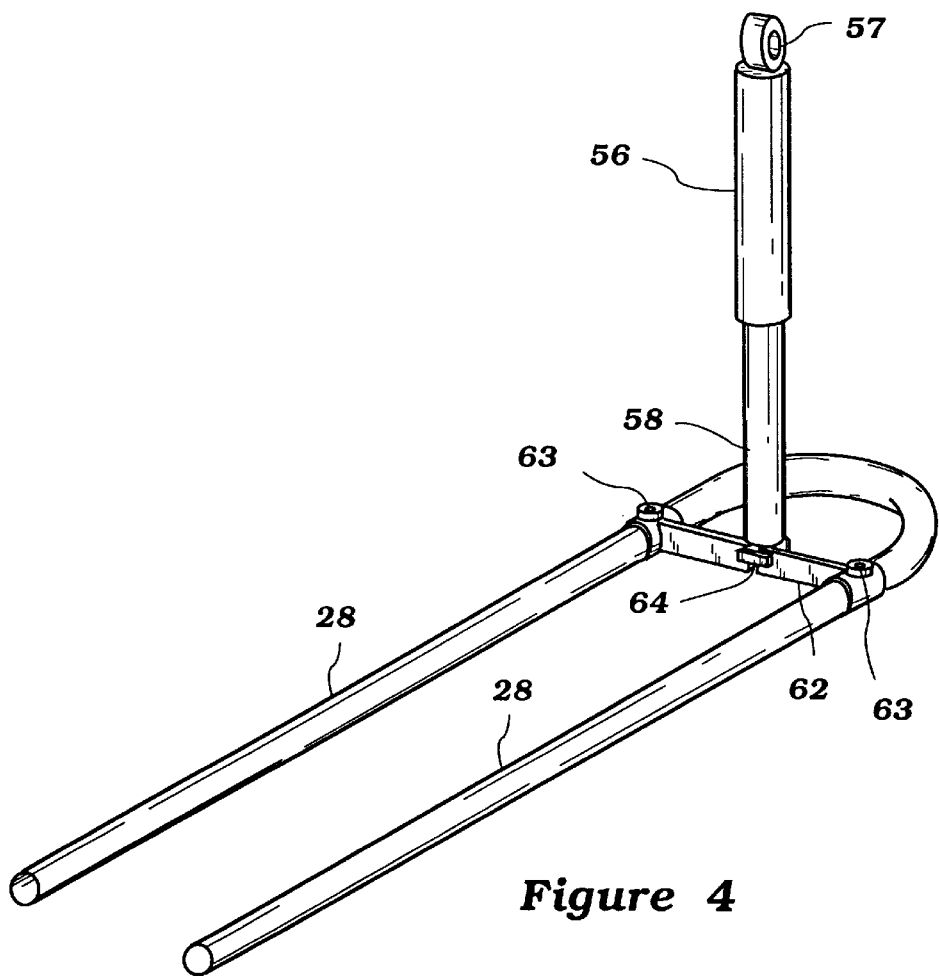
FIG. 4 is an enlarged isometric view of the seat attachment assembly with the seat not shown.

Referring now in detail to the attachment between the recumbent seat assembly 27 and the seat rails 28 as shown in FIGS. 2, 3, and 4 the recumbent seat assembly 27 consists of a seat 51 rigidly affixed to the upper surface of seat mounting bracket 52 which is slidably supported above the smaller diameter rear wheel 25 along the seat rails 28. A crank locking mechanism 53 consisting of handle 54 and bolt 55 is in threaded engagement with the seat mounting bracket 52. An upper support bar 56 is pivotally connected at its upper end to the topmost portion of the seat 51 by pivot pin 57. At its lower end support bar 56 slidingly engages lower support 58 and can be held in locking engagement with lower support 58 by support locking mechanism 59 by means which include a collar and bolt assembly 61. The lower support 58 is, in turn, connected at its lower end to the seat rails 28 by means which include bar 62, which is rigidly affixed at both ends by bolts 63 to the side rails 28 and pivotally connected to the lower support 58 by pivot pin 64.

The recumbent seat assembly 27 may be adjusted and locked in position relative to the seat rails 28 by respectively loosening, repositioning, and tightening handle 54 until such time as the bolt 43 is rigidly impinged against the seat rail 28 while simultaneously locking the upper and lower support bars 56 and 58 respectively together by tightening collar and bolt assembly 61 thus positioning the rider at the desired location above the rear wheel 25 and impeding sliding motion by the recumbent seat assembly 27.

While the above embodiment is successful in reducing the wheel base of the recumbent bicycle 11 it has a negative effect in that positioning the rider above or close to the rear wheel creates a situation where the weight distribution of the bicycle 11 is significantly biased towards the rear; an unstable and therefore non-desirable circumstance. This adverse situation is remedied in part by positioning the motor 41, battery 42, and controller 43 at forward locations in the frame 12. This moves the bicycle's center of gravity forward and effectively reduces the destabilizing effect of positioning a rider above the rear wheel.

It should be readily apparent from the foregoing description that the desired embodiments are very effective in meeting the objects as set forth. Of course, various changes and modifications may be made without departing from the spirit and scope of the invention, as defined by the appended claims.

What is claimed is:

1. A recumbent bicycle comprised of a frame assembly comprised of a head pipe, a main tube connected to said head pipe and extending rearwardly therefrom, and a down tube affixed relative to said head pipe and having a first portion extending generally vertically downwardly therefrom and a second portion beginning at the lower portion of said first portion and extending in a horizontal direction rearwardly and spaced beneath said main tube, a front wheel dirigibly supported for rotation about a front wheel axis by said head pipe of said frame assembly and immediately forwardly of said down tube first portion, a rear wheel rotatably journaled for rotation about a rear wheel axis at the rear of said frame assembly, a manually-operated pedal crank mechanism journaled by the frame assembly at a point contiguous to the juncture of said down tube first and second portions and to the rear of said front wheel axis, a seat for a rider disposed at the rear of said frame assembly so that the buttocks of a seated rider lies over said rear wheel axis and to the rear of the front edge of said rear wheel, said seat being oriented relative to said pedal crank mechanism so that the rider is seated in a recumbent fashion, and an electric motor, a battery power source for supplying electrical power to said electric motor and transmission for driving said rear wheel by said electric motor each of which is disposed at forward portions of said frame assembly forwardly of said rear wheel and behind said front wheel and in the area bounded by said main tube and said down tube for applying a substantial portion of their weight on said front wheel for balancing the weight placed on the rear wheel by the rearward seating position of the rider.

2. A recumbent bicycle as set forth in claim 1 further including torque sensing means for sensing an amount of manual torque applied by the rider to the pedal crank mechanism for controlling an amount of electric motor assist.

3. A recumbent bicycle as set forth in claim 2 wherein the frame assembly further includes a seat rail extending in an upwardly inclined direction from an intermediate portion of the main frame tube rearwardly of the electric motor and battery power source to a position over the rear wheel.

4. A recumbent bicycle as set forth in claim 3 wherein the seat is adjustable in position along the seat rail.

5. A recumbent bicycle as set forth in claim 2 wherein the amount of electric motor assist is greater in proportion to the manual torque when the manual torque is high.

6. A recumbent bicycle as set forth in claim 2 wherein the amount of electric motor assist is greater in proportion to the manual torque when the bicycle speed is low.

7. A recumbent bicycle as set forth in claim 6 wherein the amount of electric motor assist is greater in proportion to the manual torque also when the manual torque is high.

8. A recumbent bicycle as set forth in claim 2 wherein the amount of power assist for driving the rear wheel from the electric motor is substantially higher for high pedal input torques than for lower pedal input torques when the sensed bicycle speed is low for assisting the rider in accelerating said bicycle under high load and startup conditions.

9. A recumbent bicycle as set forth in claim 8 wherein the seat is disposed at least in part over the rear wheel.

10. A recumbent bicycle as set forth in claim 9 wherein the frame includes a seat rail extending in an upwardly inclined direction over the rear wheel.

11. A recumbent bicycle as set forth in claim 10 wherein the seat is adjustable in position along the seat rail.

* * * * *